United States Patent
Becouarn et al.

(10) Patent No.: US 11,591,107 B2
(45) Date of Patent: Feb. 28, 2023

(54) ELECTRONIC IMAGE DISPLAY SYSTEM FOR A VEHICLE COCKPIT WITH A THREE-DIMENSIONAL DISPLAY SURFACE

(71) Applicant: THALES, Courbevoie (FR)

(72) Inventors: Loïc Becouarn, Mérignac (FR); Florent Mennechet, Mérignac (FR); Valery Bota, Mérignac (FR)

(73) Assignee: THALES, Courbevoie (FR)

( * ) Notice: Subject to any disclaimer, the term of this patent is extended or adjusted under 35 U.S.C. 154(b) by 357 days.

(21) Appl. No.: 16/692,448

(22) Filed: Nov. 22, 2019

(65) Prior Publication Data
US 2020/0165001 A1 May 28, 2020

(30) Foreign Application Priority Data
Nov. 23, 2018 (FR) ...................................... 18 71765

(51) Int. Cl.
*B64D 43/00* (2006.01)
*G09G 5/14* (2006.01)

(52) U.S. Cl.
CPC .............. *B64D 43/00* (2013.01); *G09G 5/14* (2013.01); *B60K 2370/143* (2019.05); *B60K 2370/67* (2019.05); *G09G 2300/026* (2013.01); *G09G 2380/12* (2013.01)

(58) Field of Classification Search
CPC ...... B64D 43/00; G09G 5/14; G09G 2380/12; G09G 2300/026; B60K 2370/143; B60K 2370/67
See application file for complete search history.

(56) References Cited

U.S. PATENT DOCUMENTS

| | | | | |
|---|---|---|---|---|
| 4,657,512 A | * | 4/1987 | Mecklenborg | G09B 9/326 434/30 |
| 9,284,045 B1 | * | 3/2016 | Springer | B64D 43/00 |
| 2002/0158164 A1 | * | 10/2002 | Konig | B64D 43/00 244/1 R |
| 2012/0075120 A1 | * | 3/2012 | Barbieri | B64D 43/00 340/946 |
| 2015/0353204 A1 | * | 12/2015 | Manochio | B64D 43/00 340/971 |
| 2016/0034244 A1 | * | 2/2016 | Howard | G06Q 30/0601 345/156 |
| 2017/0327402 A1 | * | 11/2017 | Fujii | C03B 23/023 |

FOREIGN PATENT DOCUMENTS

DE   10 2015 213 592 A1   1/2017
EP       1 705 091 A2     9/2006

OTHER PUBLICATIONS

French Search Report, from the French Patent Office in counterpart French Application No. 1871765, dated Sep. 9, 2019.

* cited by examiner

*Primary Examiner* — Shaheda A Abdin
(74) *Attorney, Agent, or Firm* — ArentFox Schiff LLP (57) ABSTRACT

The display system has a three-dimensional and curved display surface made up of a single electronic display screen or several joined electronic display screens, the display surface having at least one main zone dedicated to a pilot and suitable for being located in front of said pilot, the main zone being substantially planar or concave, and at least one lateral zone associated with each main zone, each lateral zone being concave and laterally extending the associated main zone.

18 Claims, 7 Drawing Sheets

ELECTRONIC IMAGE DISPLAY SYSTEM FOR A VEHICLE COCKPIT WITH A THREE-DIMENSIONAL DISPLAY SURFACE

CROSS-REFERENCE TO RELATED APPLICATIONS

This application claims priority to French Patent Application No. 18 71765, filed on Nov. 23, 2018. The disclosure of the priority application is incorporated in its entirety herein by reference.

The present invention relates to display systems for a vehicle cockpit, for example for an aircraft cockpit.

In display systems for an aircraft cockpit, one current trend is to provide touch-sensitive image display screens and to increase the size of these display screens, in order to allow the display of a large quantity of information while retaining the readability of this information.

However, simply replacing existing display screens with larger touch-sensitive image display screens leads to problems of arranging the display screens and ergonomics of the cockpit, in particular with cockpits for two pilots that are configured to be used by two pilots seated side by side and partly sharing the same display system.

Furthermore, display systems for aircraft cockpits must comply with standards in terms of available space for each pilot, accessibility of the various functions for each pilot, difficulty in visual and tactile access to the various functions for each pilot and visibility to the outside, the display system not being able to hinder the necessary vision of the pilot(s) toward the outside of the aircraft. The required viewing angles are generally greater on the ground (takeoff, landing and taxiing) than during flight. Details can in particular be found in standard SAE ARP4101/2 "Pilot Visibility From The Flight Deck".

One aim of the invention is to propose a display system for a vehicle cockpit that makes it possible to maximize the display surface in order to potentially display a larger quantity of information and/or to display the information in larger dimensions for better readability or usage comfort, while being ergonomic.

To that end, the invention proposes an electronic image display system for a vehicle cockpit, for example of an aircraft, the display system having a three-dimensional and curved display surface made up of a single electronic display screen or several joined electronic display screens, the display surface having at least one main zone dedicated to a pilot and suitable for being located in front of said pilot, the main zone being substantially planar or concave, and at least one lateral zone associated with each main zone, each lateral zone being concave and laterally extending the associated main zone.

In specific embodiments, the display system comprises one or several of the following optional features, considered individually or according to all technically possible combinations:

- the incline of the display surface is between 30° and 55° at any point of the display surface;
- at any point of the main zone, the curve radius of the display surface, in the direction of the width of the display surface, is greater than 1500 mm;
- the height of each main zone is between 150 and 400 mm;
- the curve radius of the display surface, in the direction of the width of the display surface, is less than 1000 mm, in each lateral zone;
- the curve radius of the display surface, in the direction of the width of the display surface, is greater than 400 mm, in each lateral zone;
- the height of each lateral zone is between 150 and 400 mm;
- each lateral zone has a curve, in the direction of the width of the display surface, strictly greater than that of the associated main zone;
- it comprises a single main zone and two lateral zones associated with the main zone, each lateral zone laterally extending the main zone on a respective side;
- it comprises two main zones each dedicated to a respective pilot, a lateral zone associated with each main zone and extending this main zone on the side opposite the other main zone, and a central zone located between each of the two main zones;
- the central zone comprises a central region located between two lateral regions, each lateral region extending between the central region and a respective main region;
- the central region is convex or planar and/or each lateral region is convex;
- the central zone has a maximum height strictly greater than a maximum height of each main zone;
- the height of the display surface increases progressively as one moves from each main zone toward the central region;
- the central zone overflows relative to each main zone upward and/or downward;
- the upper edge of the display surface is curved and/or the lower edge of the display surface is curved or straight;
- each lateral zone is extended by a lateral extension extending obliquely on the side and toward the rear from the lateral zone; and
- each lateral extension has a height decreasing gradually toward its opposite end at the associated lateral zone.

The invention also relates to a cockpit for a vehicle, for example an aircraft, provided with a display system as defined hereinabove, and a vehicle, for example an aircraft, comprising such a cockpit.

The invention and its advantages will be better understood upon reading the following description, provided solely as a non-limiting example, and done in reference to the appended drawings, in which.

Figure 1:
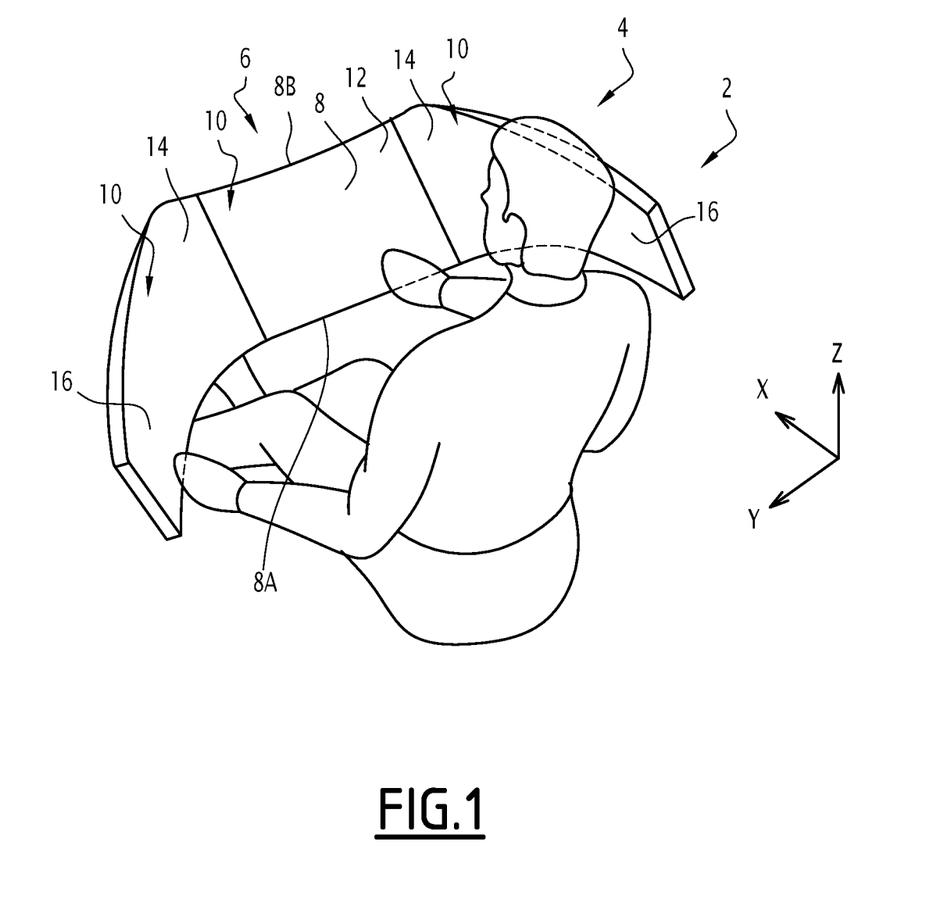
FIG. 1 is a schematic perspective view of an individual cockpit comprising an electronic image display system.
Figure 2:
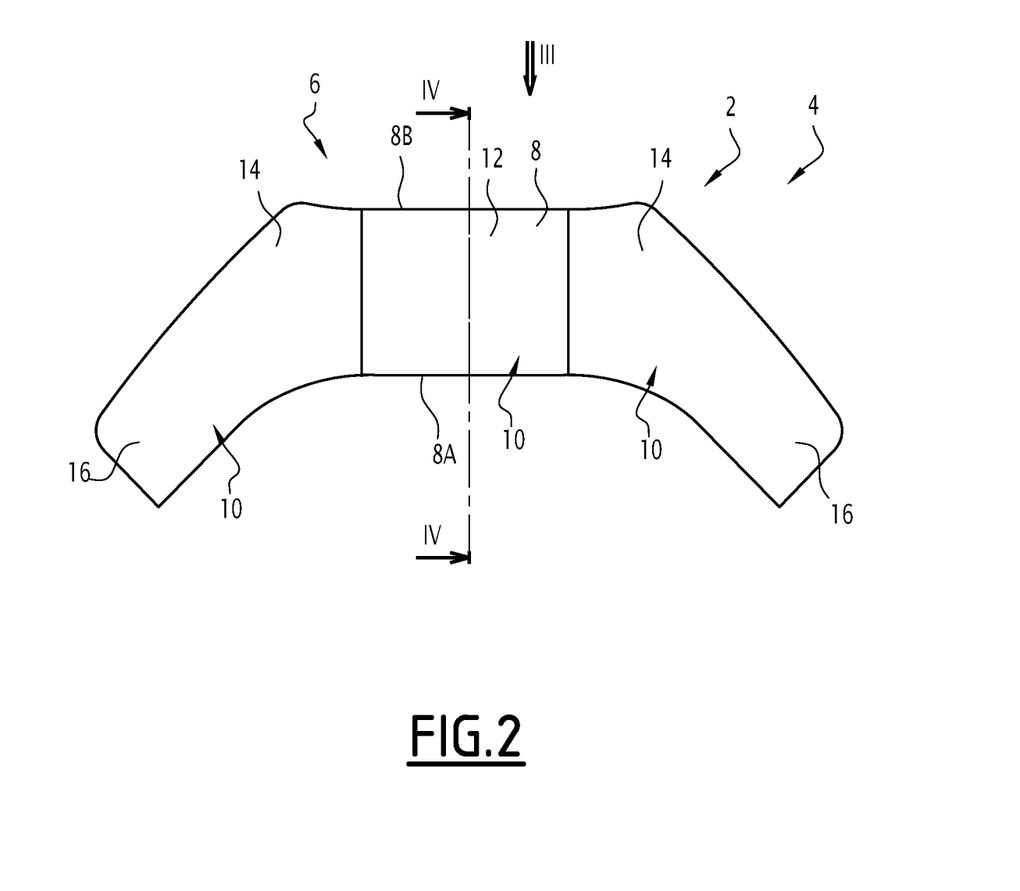
FIG. 2 is a schematic front view of the display system of FIG. 1.
Figure 3:
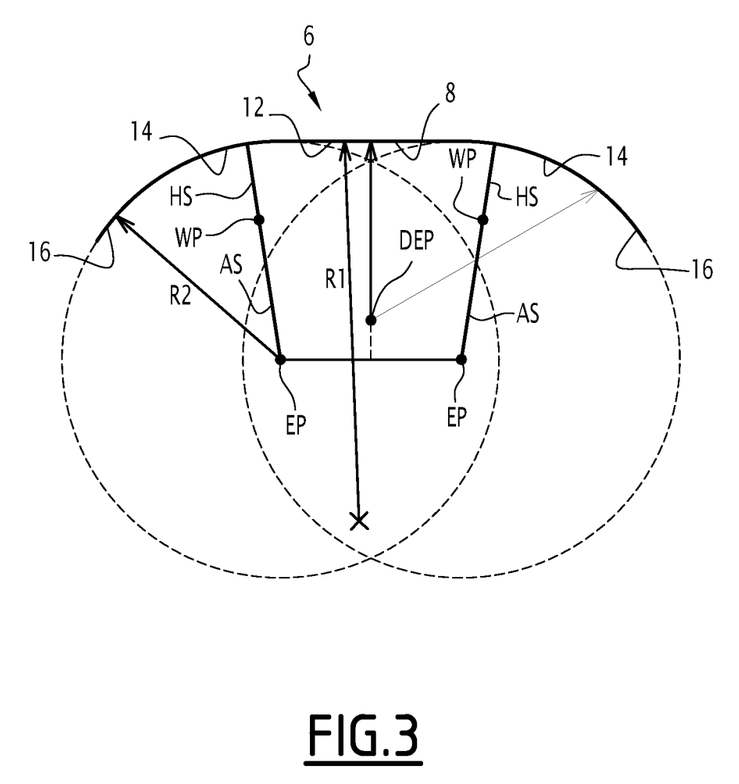
FIG. 3 is a schematic view of the display system of FIG. 1, along III in FIG. 2.

In reference to FIGS. 1 to 3, the cockpit 2 is a vehicle cockpit, for example a cockpit of an aircraft 4. The aircraft 4 is for example an airplane, a drone (that is to say, an aircraft with no human on board) or a helicopter.

In one variant, the cockpit 2 is a cockpit of a rail vehicle, a maritime vehicle, for example a surface ship or a submarine, or a road vehicle, for example a car or truck.

The cockpit 2 is located onboard the vehicle or located outside the vehicle and configured to control the vehicle remotely, for example in the case of the drone.

The cockpit 2 is for example provided for one pilot or for two pilots side by side. In FIGS. 1 to 4, it is an individual cockpit, that is to say, for just one pilot (or single-pilot cockpit).

In the remainder of the description, the terms "longitudinal", "transverse", "horizontal", "vertical", "front", "rear", "left", "right", "top" and "bottom" are to be understood in reference to the point of view of a pilot installed in the cockpit 2, relative to the orthogonal coordinate system illustrated in FIGS. 1 to 3 and comprising:
 a longitudinal axis X oriented from back to front;
 a transverse axis Y oriented from right to left; and
 a vertical axis Z oriented from bottom to top.

The cockpit 2 comprises an electronic image display system 6 configured to display images. The display system 6 can be used to display piloting data of the vehicle.

In the case of an aircraft, the display system 6 is for example configured to display data such as piloting data, navigation data, or data representing the status of the systems (engines, hydraulic, electrical, etc.).

The display system 6 has an image display system 8 that has a three-dimensional and curved shape. The display surface 8 is devoid of any break forming a reentrant angle, an outer angle or a ridge.

The display surface 8 is defined by a single electronic image display screen 10 or several joined electronic image display screens 10.

In one exemplary embodiment, each display screen 10 is for example a light-emitting screen, for example a light-emitting diode (LED) screen, in particular an organic light-emitting diode (OLED) screen.

In one exemplary embodiment, in particular allowing the absence of visible border, each screen 10 is a micro-light-emitting diode screen (micro-LED screen). In a known manner, the light-emitting diodes of a micro-LED screen generate light from an inorganic material.

In another exemplary embodiment, each display screen 10 implements a more conventional liquid crystal display (LCD) technology.

In one exemplary embodiment, each display screen 10 is devoid of visible border, such that the entire display surface 8 appears to be continuous for the user. Such display screens 10 devoid of visible border are for example micro-LED screens.

Preferably, the display surface 8 is at least partially touch-sensitive, and in particular completely touch-sensitive. To that end, for example, at least one of the display screens 10 is touch-sensitive, and in particular, each display screen 10 is touch-sensitive.

Preferably, when several display screens 10 are used, they are joined and have a continuous curved transition at the junction(s) such that the performance of tactile gestures from one display screen 10 to the next is done continuously and the graphic objects can be displayed straddling several display screens 10.

The touch-sensitive nature of the display surface 8 allows each pilot to interact with the display system 6, for example to configure the display of the data on the display surface 8 and/or to interact with and/or control systems embedded in the vehicle, such as hydraulic pumps, electric relays, lights, etc.

The display system 6 is configured to be placed in front of the pilot(s).

The display surface 8 generally extends transversely in front of the pilot(s), optionally with lateral extensions that come back toward the rear, so as to give the display surface 8 an enveloping shape relative to the pilot(s).

The display surface 8 has a lower edge 8A and an upper edge 8B.

Hereinafter, the "height" h (FIG. 4) of the display surface 8 at any point of the lower edge 8A of the display surface 8 designates the distance between the lower edge 8A and the upper edge 8B of the display surface 8 taken along the perpendicular to the lower edge 8A at the considered point of the lower edge 8A.

The display surface 8 is preferably globally inclined such that at any point of the display surface 8, the normal N (FIG. 4) to the display surface 8 is oriented upward and rearward. This makes it possible to place the display surface 8 in front of the pilot(s) below a windshield of the cockpit 2.

Thus, each pilot can look toward the outside of the vehicle through the windshield while looking horizontally in front of him, and look at the display surface 8 while looking in front of him and downward.

The incline of the display surface 8 also makes it possible to use the display surface 8 as a support to perform tactile gestures.

A compromise must be found between a significant incline that facilitates the tactile interaction, the need for vertical reference, in particular for piloting, and the minimization of ocular and/or physical fatigue for the pilots.

Preferably, the incline of the display surface 8 is between 30 and 55° at any point of the display surface 8.

The incline of the display surface 8 at any point of the display surface 8 is determined as the angle α (FIG. 4) defined between the normal N to the display surface 8 at that point and the vertical Z.

Due to the incline of the display surface 8, the lower edge 8A is horizontally closer to each pilot than the upper edge 8B.

The display surface 8 comprises at least one main zone 12, each main zone 12 being dedicated to a pilot and suitable for being located in front of said pilot.

The cockpit 2 of FIGS. 1 to 4 is provided for a single pilot, and the display surface 8 comprises a single main zone 12 dedicated to said pilot.

The display surface 8 comprises at least one lateral zone 14 associated with each main zone 12, each lateral zone 14 laterally extending the associated main zone 12.

The display surface 8 of FIGS. 1 to 4 here comprises two lateral zones 14 each extending the main zone 12 laterally on a respective side, one to the right, the other to the left.

The main zone 12 is substantially planar or curved, in particular concave.

This allows the pilot to have good visibility and tactile accessibility to the entire main zone 12 located in front of him, in particular in light of the expanse of the main zone 12 in the transverse direction, that is to say, in the direction of the width of the display surface 8.

The extend of the main zone 12 in the direction of the width is for example between 30 cm and 60 cm. It corresponds to the distance between the two elbows of the user at rest.

Preferably, at any point of the main zone 12, the curve radius R1 (FIG. 3) of the display surface 8 is greater than 1500 mm. The main zone 12 can have a curvature in the direction of the width (that is to say, when one moves over the display surface from right to left or vice versa) and/or have a curvature in the direction of the height (that is to say, when one moves over the display surface from bottom to top or vice versa).

Preferably, the main zone 12 is curved in the direction of the width (when one travels over the main zone transversely, from right to left or vice versa).

In one exemplary embodiment, and as illustrated in FIGS. 1 to 4, the main zone 12 is curved in the direction of the width (moving from right to left or vice versa), but is not curved in the direction of the height (moving from bottom to top or vice versa).

Figure 4:
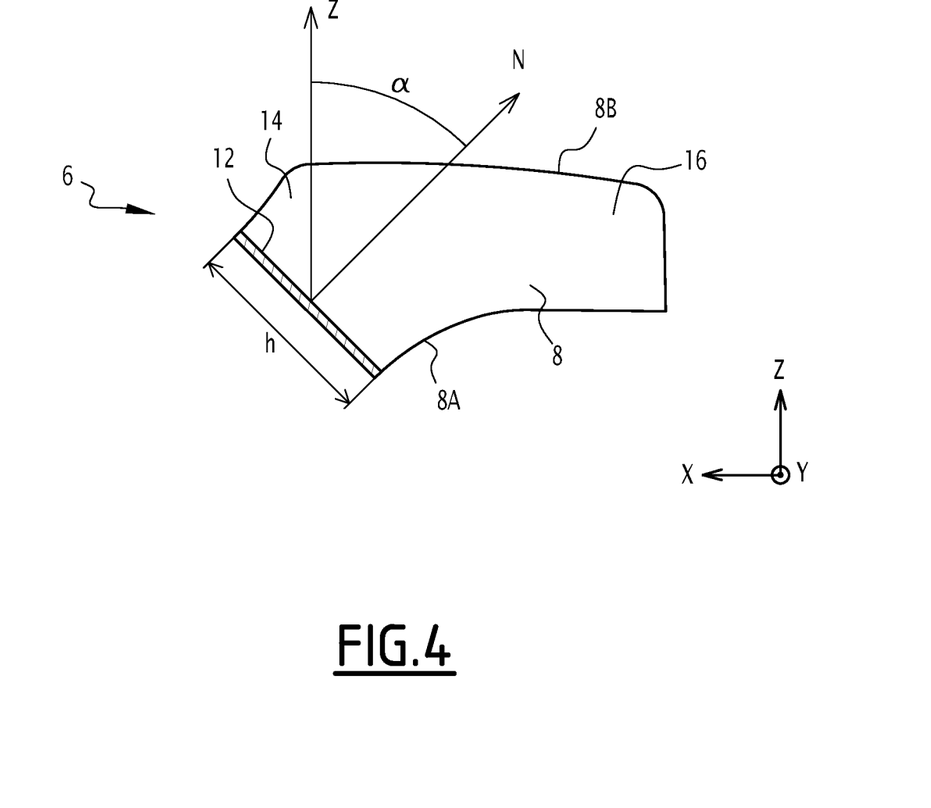
FIG. 4 is a schematic sectional view of the display system of FIGS. 1 and 2 along IV-IV in FIG. 2.

In this case, the section of the main zone 12 in any vertical and longitudinal plane passing through the main zone 12 is substantially straight, as illustrated in FIG. 4 in which the section plane is a vertical and longitudinal plane passing through the middle of the main zone 12.

Preferably, the curvature in the direction of the width of the display surface 8 increases moving from the middle of the main zone 12 toward the or each lateral zone 14 extending the main zone 12 laterally. The curvature thus follows the natural movement of the hands when they move toward the outside.

In one exemplary embodiment, the main zone 12 has a substantially constant curvature in the direction of the width, and the curvature in the direction of the width of the display surface 8 increases in each lateral zone 14 adjacent to the main zone 12.

In this case, each lateral zone 14 adjacent to the main zone 12 has a curvature in the direction of the width greater than that of the main zone 12.

In a variant, the main zone 12 has a curvature in the direction of the width that is variable, and that increases from the middle of the main zone 12 toward the or each lateral zone 14 adjacent to the main zone 12.

In one exemplary embodiment, the main zone 12 has a curvature in the width direction that is constant in a region of constant curvature located around the middle of the main zone 12, and which increases between the region of constant curvature and each lateral zone 14 adjacent to the main region 12.

In a variant, the curvature in the width direction of the main zone 12 increases constantly from the middle of the main zone 12 while moving toward each lateral zone 14 adjacent to the main zone.

Preferably, in the various examples and variants described hereinabove, in each lateral zone 14, the curve radius R2 (FIG. 3) of the display surface 8 in the width direction is less than 1000 mm and typically greater than 400 mm.

The display surface 8 optionally comprises at least one lateral extension 16 extending a corresponding lateral zone 14 laterally outward, that is to say, away from the associated main zone 12, each lateral extension 16 extending obliquely outward and rearward from the corresponding lateral zone 16.

Thus, the display surface has an enveloping form, each lateral extension 16 returning rearward on the pilot side.

Each lateral extension 16 is for example configured to extend below a lateral window of the cockpit 2.

The display surface 8 of the cockpit of FIGS. 1 to 4 comprises two lateral extensions 16, each extending a respective lateral zone 14.

Each lateral extension 16 has a height that decreases progressively from the associated lateral zone 14 toward the free end of the lateral extension 14 opposite the associated lateral zone 14.

This makes it possible on the one hand to favor the view toward the outside above the display system 6 and to allow the positioning of flight controls, such as mini-control sticks or a throttle lever nearer the lower part of the display system 6.

Advantageously, in a variant or optionally, the upper edge 8B of the display surface 8 gradually descends along each lateral extension 16 as one moves toward the free end of the lateral extension 16.

This makes it possible to clear visibility on the sides for the pilot.

Advantageously, in a variant or optionally, the lower edge 8A of the display surface 8 gradually descends along each lateral extension 16 as one moves toward the free end of the lateral extension 16.

This makes it possible to keep a sufficient height for the lateral extension 16, allowing images to be displayed readably, while leaving the necessary available space below the display system 6, for example for control sticks or control levers (for example, the throttle lever).

Each lateral extension 16 for example has a height that decreases progressively from the associated lateral zone 14 toward a free end of the lateral extension 16 opposite the associated lateral zone 14.

In one exemplary embodiment, each lateral extension 16 has a curvature similar to that of the zone 14 in the direction of the width and/or in the direction of the height. This is more favorable to the ergonomics of the cockpit 2.

In the main zone 12, the lower edge 8A must allow the passage of the knees of each pilot below the display system 6, such that each pilot is close enough to the display surface 8 to facilitate the tactile interactions.

Considering the display surface 8 as a whole, the upper edge 8B and the lower edge 8A of the display surface 8 are preferably curved, while being able to have straight portions and curved portions extending in the extension of one another.

The upper edge 8B and/or the lower edge 8A of the display surface 8 are for example substantially straight along each lateral extension 16.

As illustrated in FIGS. 1 to 4, the upper edge 8B and the lower edge 8A of the display surface 8 are substantially straight along each lateral extension 16.

Each lateral zone 14 for example forms a transition between the associated main zone 12 and an associated lateral extension 16, between which the lateral zone 14 is located.

In the illustrated example, the upper edge 8B and the lower edge 8A of the display surface 8 are curved at each lateral zone 14 in order to ensure the continuity between the main zone 12 and the corresponding lateral extension 16.

More particularly, the upper edge 8B and the lower edge 8A of the display surface 8 for example extend substantially transversely and horizontally along the main zone 12, obliquely rearward and downward along each lateral extension 16, the upper edge 8B and the lower edge 8A of the display surface 8 forming connecting curves along each lateral zone 14.

As illustrated in FIG. 3, a pilot can be modeled by a Design Eye Point (DEP) representing the viewing center of the pilot, two fixed elbow points EP representing the elbows of the pilot, two wrist points WP representing the wrists of the pilot, two forearm segments AS modeling the forearms of the pilot, each forearm segment AS extending from an elbow point EP to a wrist point WP, and two hand segments HS representing the hands of the pilot, each hand segment HS extending from a wrist point WP. The two elbow points EP are spaced apart transversely.

Considering the hands to be fixed relative to the forearms and aligned with the forearms, and considering that each forearm pivots around the associated elbow point EP, the free end of each hand draws a circle around the associated elbow point EP, the centers of the two circles being offset transversely by a distance separating the two elbow points EP.

Such a movement of the hands is considered to minimize efforts for the pilot.

The display surface 8 comprising the main zone 12, which is substantially planar or has a small curvature in the width direction, extended laterally by the lateral zones 14 having a more pronounced curvature in the width direction than that of the main zone 12, makes it possible to obtain a display having good visibility while having good ergonomics.

Indeed, the main zone 12, substantially planar or slightly curved in the width direction, allows the pilot to have a good view of the images displayed in this zone, and each more curved lateral zone 14 allows the pilot to have a good view by turning the eyes and/or head toward this lateral zone 14, the view being done substantially along the normal of the portion of the lateral zone 14 looked at by the pilot, and not obliquely as would be the case with a lateral screen that would be flat and substantially coplanar with a central screen, also flat.

Furthermore, the shape of the display surface 8 in the width direction substantially marries the two circles described by the ends of the hands of the pilot model.

Thus, the display surface 8 makes it possible to minimize the efforts necessary by the pilot to interact with the display surface 8, and therefore to improve the ergonomics of the cockpit 2.

The lateral extensions 16 extending the lateral zones 14 make it possible to increase the area of the display surface 8 with good visibility and good ergonomics.

Figure 5:
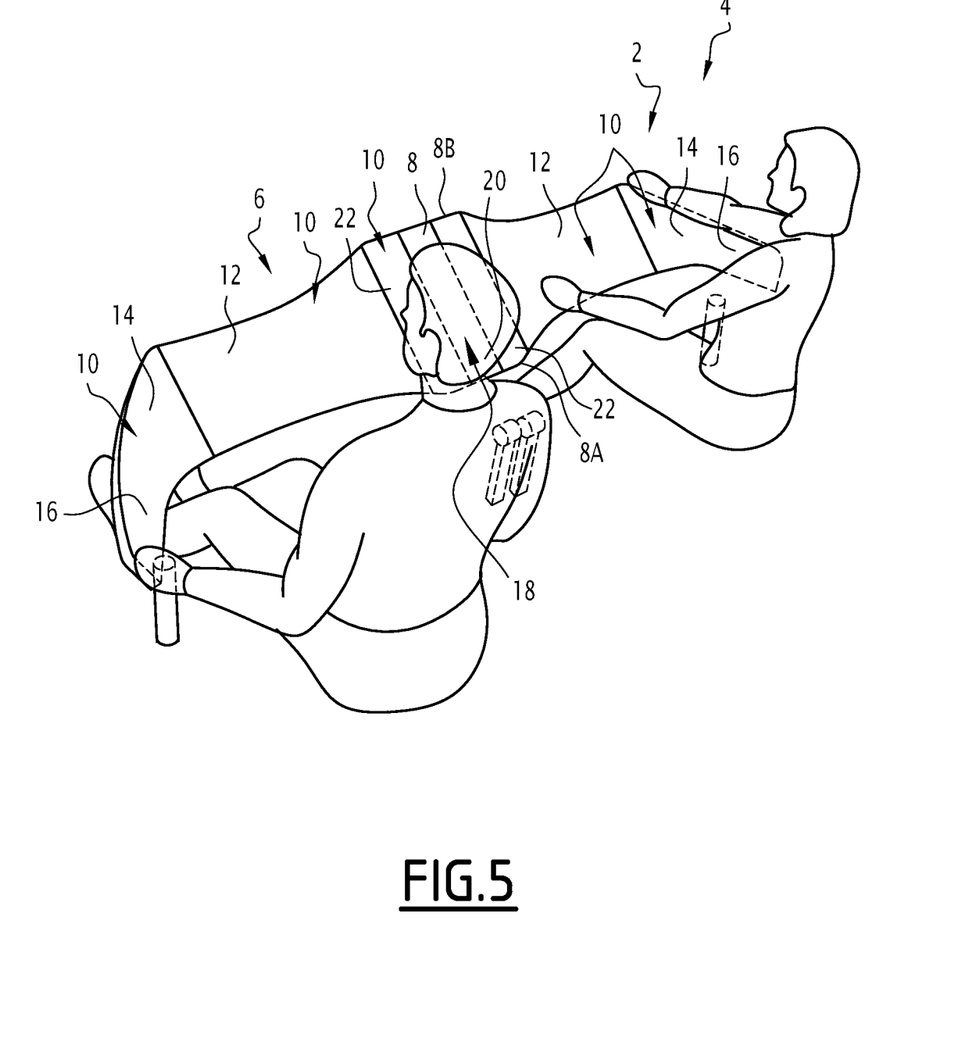
FIG. 5 is a schematic perspective view of a cockpit for two pilots, comprising an electronic image display system.
Figure 6:
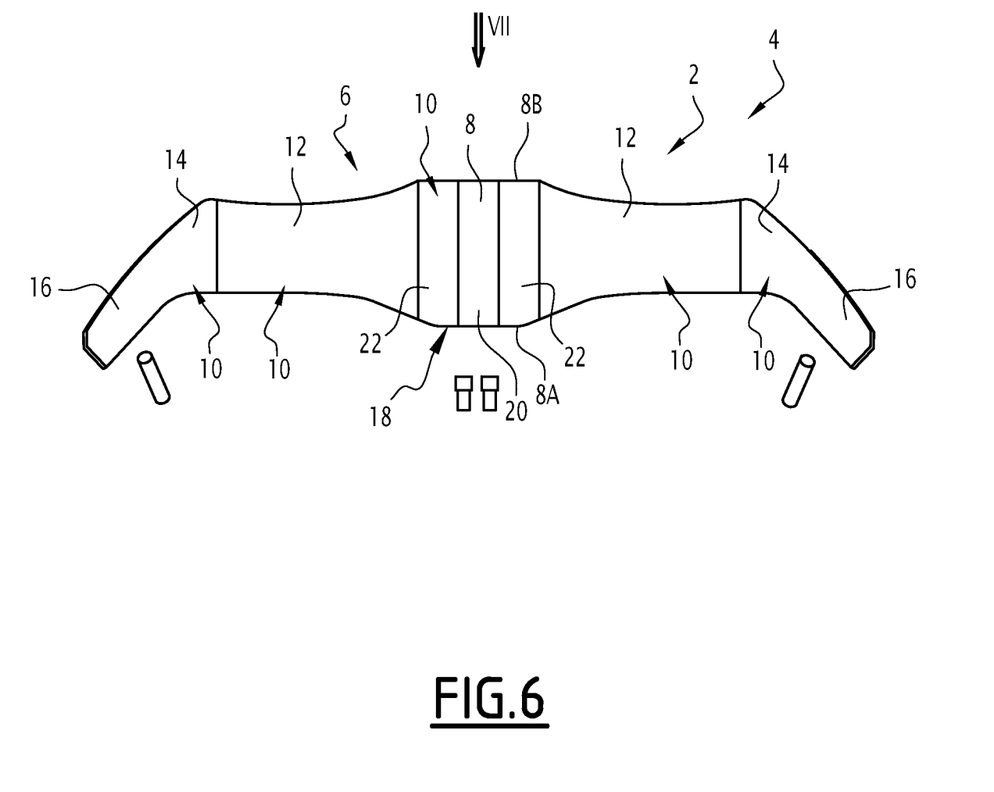
FIG. 6 is a schematic front view of the display system of the cockpit of FIG. 5.
Figure 7:
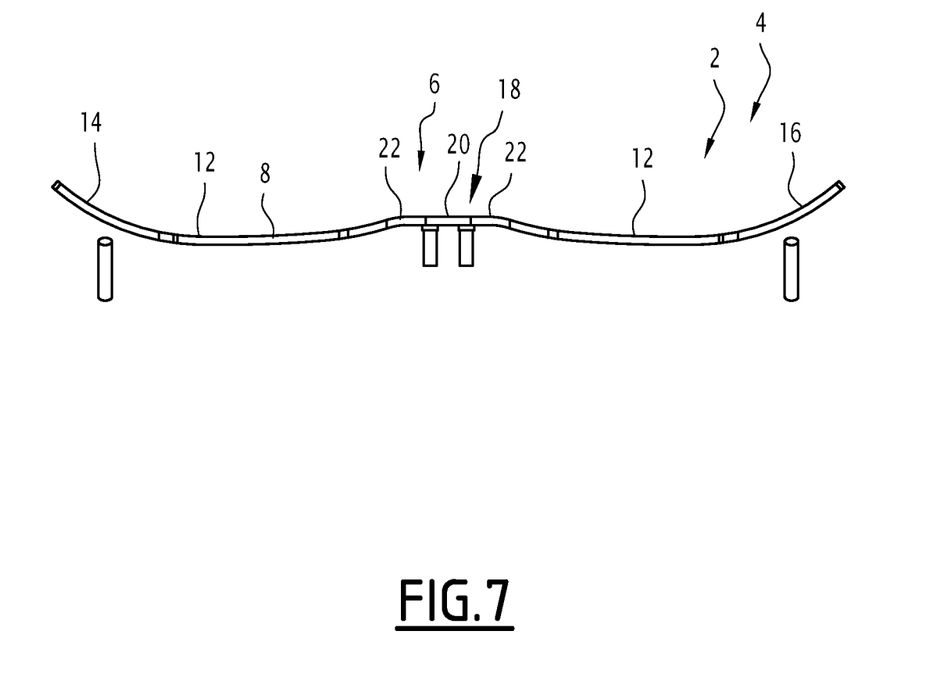
FIG. 7 is a schematic view of the display system of the cockpit of FIGS. 5 and 6, along VII in FIG. 6.

The cockpit 2 of FIGS. 5 to 7 differs from that of FIGS. 1 to 4 in that it is configured for two pilots seated next to one another. The numerical references for similar elements are retained.

The display surface 8 comprises two main zones 12 each dedicated to a respective pilot, two lateral zones 14, each of the two lateral zones 14 extending a respective main zone 12 outward, that is to say, on the side opposite the other main zone 12, and a central zone 18 located between the two main zones 12.

The display surface 8 for example comprises two lateral ends 16, each lateral end 16 laterally extending a respective lateral zone 14, while obliquely extending outward and rearward.

The display surface 8 is three-dimensional and curved.

Each main zone 12 is substantially planar or slightly curved in the width direction, while preferably having a curve radius greater than or equal to 1500 mm.

The central zone 18 is a display zone shared by the two pilots.

The central zone 18 extends between the two main zones 12, connecting them.

The central zone 18 is raised relative to the main zones 12. The central zone 18 is offset upwardly and toward the rear relative to each of the two main zones 12. The central zone 18 protrudes upward and toward the rear relative to the main zones 12. The central zone 18 forms an undulation protruding at the center of the display surface 8. This allows tactile accessibility and improved visibility of the central zone 18 for both pilots. The central zone 18 can thus serve as a shared display zone for the two pilots.

Preferably, the central zone 18 and the two main zones 12 are oriented substantially in the same direction. More specifically, the normal to the center of the central zone 18 and the normal to the center of each main zone 12 are oriented in a same oblique direction, oriented upward and toward the rear.

The display surface 8 is substantially symmetrical relative to a vertical and longitudinal median plane.

Each main zone 12 and each associated lateral zone 14 are configured substantially in the same manner as in FIGS. 1 to 3.

Thus, the display surface 8 has a curvature in the direction of the width that increases as one moves from the center of each main zone 12 toward the associated lateral zone 14.

Each main zone 12 has a constant or variable curvature, in particular increasing progressively from the center of the main zone 12 toward the associated lateral zone 14.

Each main zone 12 is connected, from the side opposite the associated lateral zone 14, to the central zone 18, with a surface continuity.

The central zone 18 has a central region 20 located between two lateral regions 22, each lateral region 22 extending between the central region 20 and a respective main region 12.

In the illustrated example, each lateral region 22 is convex.

The central region 20 is substantially planar or slightly curved. When the central region 20 is convex, its curvature radius is preferably greater than 1500 mm. This allows good visibility of the central region 20 by the two pilots.

Optionally, the central zone 18 has a maximum height strictly greater than the maximum height of each of the main zones 12. This makes it possible to increase the area of the display surface 8 without hindering the forward visibility of each pilot toward the outside. The certification standards indeed require a greater downward viewing angle when the pilot is looking in front of him than when he is looking to the sides (see for example recommendation ARP4101/2).

Preferably, the height of the display surface 8 increases progressively as one moves from each main zone 12 toward the central region 18.

Advantageously, the central zone 18 overflows relative to each main zone 12 upward and/or downward.

The central zone 18 overflows here relative to each main zone 12 upward and downward. The display surface 8 becomes larger upward and downward from each main zone 12 and toward the central zone 18.

This allows the area of the display surface 8 to become larger.

Optionally or as a variant, the display surface 8 has, on its upper edge 8B, at each lateral zone 14, a protuberance protruding upward.

By moving from a main zone 12 toward the associated lateral zone 14, the upper edge 8B of the display surface 8 rises gradually, before descending again along the lateral zone 14, and optionally the lateral extension 16 extending the lateral zone 14.

This protuberance makes it possible to increase the display surface without hindering the view on the outside, in a zone for example corresponding to a windshield post.

The display system 6 for two pilots makes it possible to benefit from a large display surface 8 with a three-dimensional and curved shape providing good visibility and good tactile accessibility for each pilot.

The display surface 8 in particular makes it possible to have zones dedicated to a pilot that are usable while minimizing the efforts for the pilot. It further allows easy information sharing, with the central zone 18 that can be used easily by both pilots, and also the lateral zone 14 and if applicable the lateral extension 16 of a pilot, which are visible for the other pilot due to their orientation.

Indeed, due to the curvature of the display surface 8, each lateral zone 12, and if applicable the associated lateral extension 16, is turned more toward the other pilot than the main zone.

The display surface 8 formed by a display screen or several joined display screens is substantially continuous.

This makes it possible to allow each pilot to configure the image display on the display surface 8 by positioning each image displayed by the display surface, for example by moving a corresponding window.

Thus, a pilot wishing to share information with the other pilot that is contained in an image can for example slide this image toward the central zone 18 to allow the other pilot to see this information easily.

Preferably, the display surface 8 as a whole is a developable surface.

In particular, in the context of display screen technology of the LCD or OLED type, the implementation of a developable surface makes it possible to perform flat manufacturing of the components of each display screen and to curve them during assembly in order to obtain the desired shape. The flat manufacturing of the components simplifies the industrial process and reduces the associated costs.

The developable display surface 8 is formed by an infinity of straight lines called generatrixes, the plane tangent to the display surface 8 being the same at any point of the generatrix.

The generatrixes of the display surface 8 for example extend substantially along the height of the display surface 8. Thus, the display surface 8 is not curved in the height direction, but is curved in the width direction.

This applies in general, and in particular to the different exemplary embodiments described above.

In particular, no zone among the main zone 12, each lateral zone 14, and if applicable, each lateral extension 16 and the central zone 18 of the display surface is curved in the height direction, the main zone 12 being substantially planar or curved in the width direction, each lateral zone 14 being curved in the width direction. Optionally, if applicable, each lateral extension 16 can be curved in the width direction and/or the central zone 18 can be curved in the width direction.

As indicated above, the display surface 8 is formed by a display screen 10 or several joined display screens 10.

Returning to FIGS. 1 to 4, the display surface 8 is for example formed by a main display screen 10, corresponding to the main zone 12 and two lateral display screens 10, each lateral display screen 10 defining a respective lateral display zone 14, and also, if applicable, an associated lateral extension 16.

This enables separate manufacturing of the central display screen 10, the geometry of which is simplest, and the lateral display screens 10, the geometry of which is more complicated.

Returning to FIGS. 5 to 7, the display surface 8 is for example formed by two main display screens 10 each defining a respective main zone 12, two lateral display screens 10, each defining a respective lateral zone 14 and optionally an associated lateral extension 16, and a central display zone 10 defining the central zone 18.

In the various exemplary embodiments, advantageously, each display screen extends along a developed surface portion, with the associated advantages indicated above.

The invention claimed is:

1. An electronic image display system for a vehicle cockpit, the display system having a three-dimensional and curved display surface made up of a single electronic display screen or several joined electronic display screens, the display surface comprising:
    at least one main zone dedicated to a pilot and located in front of said pilot, the main zone being substantially planar or concave, and
    at least one lateral zone associated with each main zone, each lateral zone being concave and laterally extending the associated main zone;
    wherein:
    each display screen is a light-emitting screen and is devoid of a visible border, such that the display surface comprising the at least one main zone and the at least one lateral zone appears continuous;
    each lateral zone is extended by a lateral extension extending towards a rear of the vehicle cockpit from the lateral zone; and
    the display surface has a height dimension at each lateral extension that decreases gradually from a first display height dimension near an associated lateral zone toward a second display height dimension at an end of the respective lateral extension opposite to the associated lateral zone, wherein the second display height dimension is smaller than the first display height dimension.

2. The display system according to claim 1, the display surface has an incline between 30° and 55° at any point of the display surface.

3. The display system according to claim 1, wherein, at any point of the main zone, the curve radius of the display surface, in the direction of the width of the display surface, is greater than 1500 mm.

4. The display system according to claim 1, wherein the height of each main zone is between 150 and 400 mm.

5. The display system according to claim 1, wherein the curve radius of the display surface, in the direction of the width of the display surface, is less than 1000 mm, in each lateral zone.

6. The display system according to claim 1, wherein the curve radius of the display surface, in the direction of the width of the display surface, is greater than 400 mm, in each lateral zone.

7. The display system according to claim 1, wherein the height of each lateral zone is between 150 and 400 mm.

8. The display system according to claim 1, wherein each lateral zone has a curve, in the direction of the width of the display surface, strictly greater than that of the associated main zone.

9. The display system according to claim 1, comprising two main zones each dedicated to a respective pilot, a lateral zone associated with each main zone and extending the respective main zone on the side opposite the other main zone, and a central zone located between each of the two main zones.

10. The display system according to claim 9, wherein the central zone comprises a central region located between two lateral regions, each lateral region extending between the central region and a respective main region.

11. The display system according to claim 10, wherein the central region is convex or planar or each lateral region is convex.

12. The display system according to claim 9, wherein the central zone has a maximum height strictly greater than a maximum height of each main zone.

13. The display system according to claim 9, wherein the display surface has a height dimension at each main zone that increases progressively from a third display height dimension at each main zone toward a fourth display height dimension at the central zone, wherein the fourth display height dimension is greater than the third display height dimension.

14. The display system according to claim 9, wherein the central zone overflows relative to each main zone upward or downward.

15. The display system according to claim 1, wherein the upper edge of the display surface is curved or the lower edge of the display surface is curved or straight.

16. A vehicle, comprising a cockpit provided with a display system according to claim 1.

17. The display system of claim 1, wherein the vehicle cockpit is an aircraft cockpit.

18. An electronic image display system for a vehicle cockpit, the display system having a three-dimensional and curved display surface made up of a single electronic display screen or several joined electronic display screens, the display surface comprising:

a single main zone dedicated to a pilot and located in front of said pilot, the main zone being substantially planar or concave, and two lateral zones associated with the main zone, each lateral zone being concave and laterally extending the main zone on a respective side;

wherein:

each display screen is a light-emitting screen and is devoid of a visible border, such that the display surface comprising the main zone and the two lateral zones appears continuous;

each lateral zone is extended by a lateral extension towards a rear of the vehicle cockpit from the lateral zone; and the display surface has a height dimension at each lateral extension that decreases gradually from a first display height dimension near an associated lateral zone toward a second display height dimension smaller than the first display height dimension at an end of the respective lateral extension opposite to the associated lateral zone.

* * * * *